March 8, 1966          G. T. ELIASSEN          3,239,054

CONVEYOR TRANSFER SYSTEM

Original Filed Oct. 5, 1962          3 Sheets-Sheet 1

INVENTOR.
BY
*his* ATTORNEY

March 8, 1966 G. T. ELIASSEN 3,239,054
CONVEYOR TRANSFER SYSTEM
Original Filed Oct. 5, 1962 3 Sheets-Sheet 3

INVENTOR.

3,239,054
CONVEYOR TRANSFER SYSTEM
Gunnar Thure Eliassen, Partille, Sweden, assignor to Aktiebolaget Electrolux, Stockholm, Sweden, a corporation of Sweden
Original application Oct. 5, 1962, Ser. No. 228,522, now Patent No. 3,173,557, dated Mar. 6, 1965. Divided and this application Jan. 10, 1964, Ser. No. 345,057
Claims priority, application Sweden, Feb. 16, 1962, 1,722/62
8 Claims. (Cl. 198—21)

This application is a division of my application Serial No. 228,522, filed October 5, 1962, now Patent No. 3,173,557.

My invention relates to a conveyor system for sorting articles.

An object of my invention is to provide an improved transfer or switching unit of simplified construction for transferring articles from a stationary roller conveyor, which defines a path for moving articles downward thereon by gravity, to a movable conveyor which is transverse thereto.

Another object of my invention is to provide an improved transfer or switching unit of simplified construction for transferring articles from a stationary roller conveyor, which defines a path for moving articles downward thereon by gravity, to a movable conveyor which is transverse thereto, the transfer unit comprising an elongated frame which bridges the movable conveyor and is pivotably mounted for movement between upper and lower positions about an axis and whose end remote from the axis overlaps the lower end of the stationary conveyor.

A further object of my invention is to provide an improved transfer or switching unit for transferring articles from a stationary roller conveyor to a movable conveyor in which the articles are always in a stable position when they are being transferred from one conveyor to the other by the transfer unit.

Further objects and advantages of my invention will become apparent as the following description proceeds, and the features of novelty which characterize my invention will be pointed out with particularity in the claims annexed to and forming a part of this specification.

Figure 1:
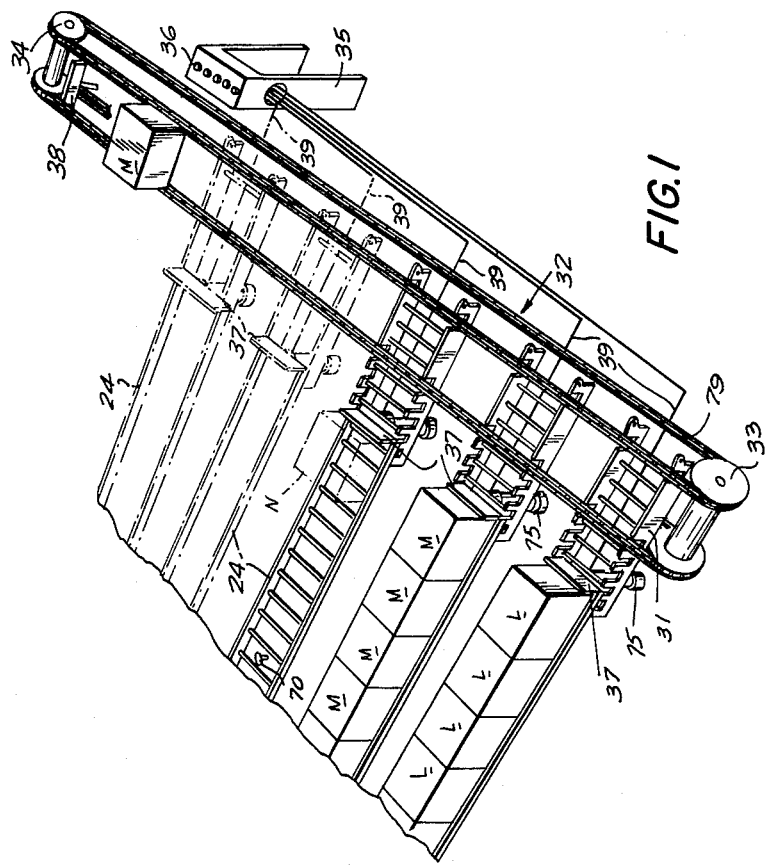
Figure 2:
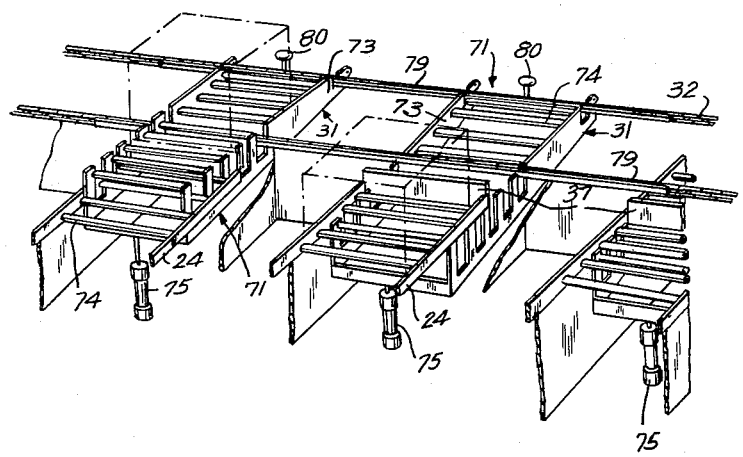
Figure 3:
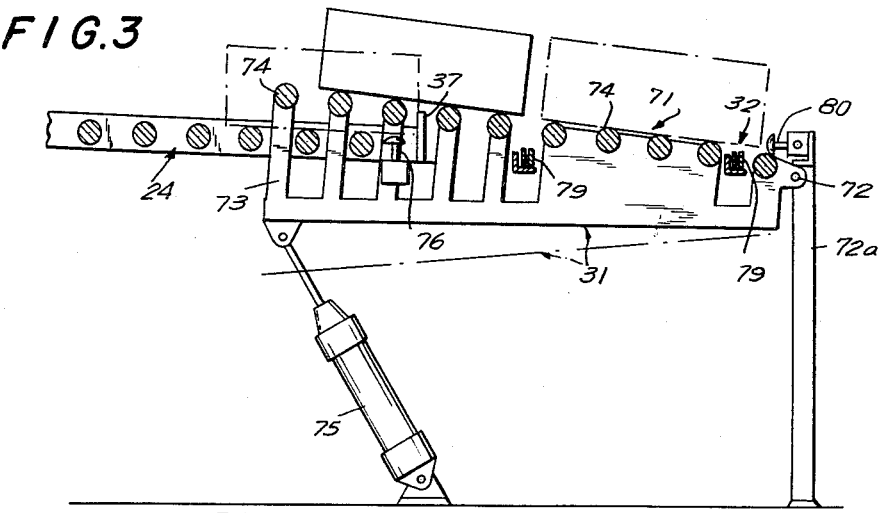
Figure 4:
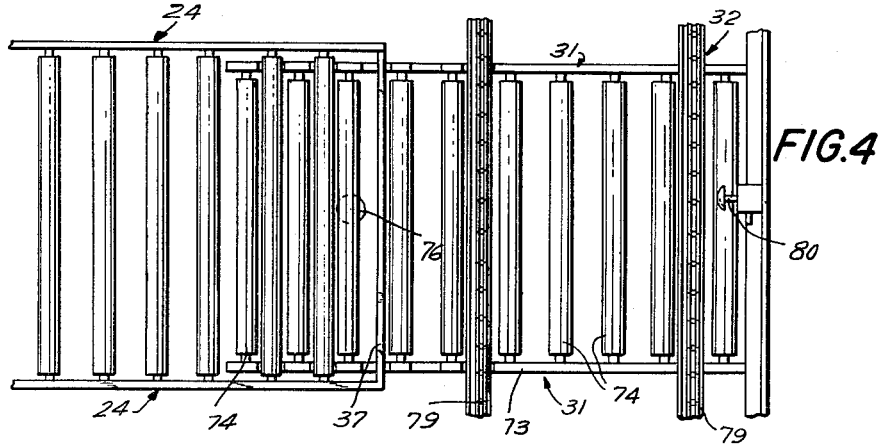
Figure 5:
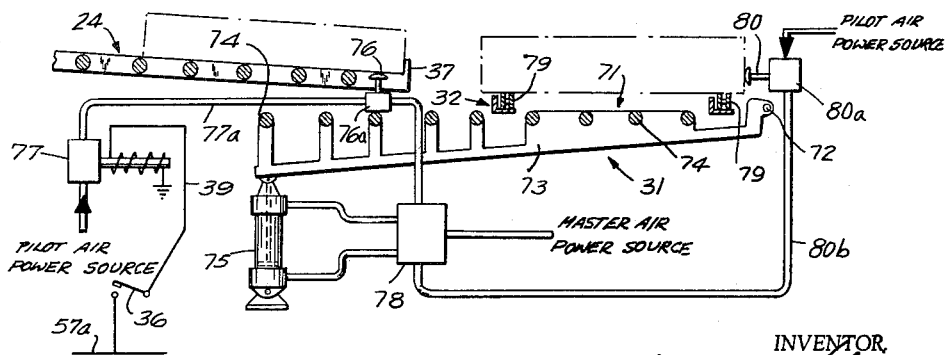

In the drawing, FIG. 1 is a perspective view diagrammatically illustrating an embodiment of my invention; FIG. 2 is an enlarged fragmentary view of parts shown in FIG. 1; FIG. 3 is a side elevation of parts shown in FIG. 2; FIG. 4 is a plan view of the parts illustrated in FIG. 3; and FIG. 5 diagrammatically illustrates the parts shown in FIG. 3 and control features.

In FIGS. 1 and 2 I have diagrammatically illustrated apparatus embodying my invention which includes transfer or switching units 31 for selectively transferring articles from storage paths 24 to an endless delivery conveyor 32 operating over end rollers 33 and 34 which may be driven by a suitable electric motor (not shown). Each article is automatically transferred from its storage path 24 to the delivery conveyor 32 by depressing on a control panel 35 a particular operating member 36 corresponding to the storage path selected, five such operating members being provided on the control panel 35. At the vicinity of the delivery conveyor 32 a stop 37 is provided in each storage path 24 which normally is in the path of movement of the articles and limits their movement toward the delivery conveyor 32. When a particular operating member 36 is depressed, one of the transfer or switching units 31 is rendered operable to permit an article to be transferred from its storage path to the delivery conveyor 32, at which time the stop 37 momentarily is rendered ineffective and out of the path of movement of the article immediately adjacent to the delivery conveyor. As seen in FIG. 1, the delivery conveyor 32 is provided with a stop 38 at its discharge end.

As shown in FIG. 2, the storage paths 24 may slope downward to the delivery conveyor 32 to promote downward gravity movement of the articles L, M and N toward the stops 37. When the article N, indicated by dotted lines in FIG. 1, bears against one of the stops 37, a major portion of its weight is directly over a part of one of the transfer or switching units 31 which is operable to transfer the article to the delivery conveyor 32. With this arrangement, as best shown in FIG. 3, the center of gravity of an article is between the end extremities of the switching unit 31 and will remain in a stable position on the switching unit when it becomes operable to transfer the article from the storage path 24 to the delivery conveyor 32, as will be explained presently.

In FIG. 1 I have diagrammatically shown electrical conductors 39 connecting the transfer or switching units 31 and the operating panel 35, each conductor being associated with a different one of the operating members 36.

Referring to FIGS. 1 to 4, it will be seen that the storage paths 24 comprise suitable frame structure having stationary rollers in spaced relation. The delivery conveyor 32 comprises a pair of spaced apart endless chains 79. The end rollers for the chain conveyor comprise spaced sprocket wheels (not shown).

By providing storage paths 24 which slope downward to the delivery conveyor 32, the articles on the storage paths will roll by gravity against the stops 37. Each article resting against a stop 37 can be transferred from a storage path 24 to the delivery conveyor 32 by one of the transfer or switching units 31. As best shown in FIGS. 2 and 3 to 5, each switching unit 31 comprises a frame 71 having spaced sides 73 in which the opposite ends of rollers 74 are fixed. Each switching unit 31 is pivotally connected at 72 to upright members 72a at one side of the delivery conveyor 32. At its opposite outer end each switching unit 31 is connected to the vertically movable piston of a cylinder 75 which is pneumatically operated by a fluid under pressure, such as compressed air, for example. Portions of the spaced sides 73 are recessed or notched to permit the rollers 74 of the frame 71 to be raised above the chain conveyors 79 to the solid line position shown in FIG. 11.

When an article has moved against a stop 37, the article acts upon a button 76 which may be referred to as a pneumatic control member. The button 76 forms a part of a button operated pilot valve 76a connected in a pilot air control system 77a, as shown in FIG. 5. A solenoid operated pilot valve 77, which is also provided in the pilot air control system 77a, is actuated by closing one of the operating members 36 on the control panel 35. As seen in FIG. 5, this completes an electrical circuit from a source of electrical energy through conductor 57a, switch or operating member 36, conductor 39 and solenoid operated pilot valve 77 to ground.

The pilot air control system 77a controls flow of compressed air from a pilot air source through pilot valves 77 and 76a to a master control valve 78 which is arranged to supply compressed air from a master air power source either to the space above or below the piston in cylinder 75. When the solenoid operated pilot valve 77 is energized and button operated pilot valve 76a is actuated, the pilot air control system 77a causes master air control valve 78 to function and effect upward movement of the piston in cylinder 75 to raise the switching unit 31 about its pivotal connection 72 from the dotted line to the solid line position in FIG. 3. The outer end of the switching unit 31 extends beyond the stop 37 for a sufficient distance so that, when the switching unit 31 raises and lifts the article from the storage path 24, the outer end of the unit extends beyond the center of gravity of the article.

When the rollers 74 of the switching unit 31 are at a level above the top edge of the stop 37, the article rolls by gravity over the conveyor chains 79 of the delivery conveyor 32, as indicated in dotted lines in FIGS. 3 and 5. When this occurs the article acts upon a button or pneumatic control member 80. The bottom 80 forms a part of a button operated pilot control valve 80a connected in a pilot air control system 80b, as shown in FIG. 5, for controlling flow of compressed air from a pilot air source to the master control valve 78. When the button operated pilot control valve 80a is acted upon by the box, the pilot air control system 80b becomes operable to cause the master air control valve 78 to function to effect downward movement of the piston in cylinder 75 and lower the switching unit 31 to the position shown in FIG. 5. When this occurs the next box in the storage path 24 can move against the stop 37. It will now be understood that the movable conveyor 32 comprises first and second spaced apart endless members 79 and a plurality of stationary conveyors 24 are transverse thereto, the conveyors 24 comprising spaced rollers defining a path for moving articles downward thereon by gravity. Each conveyor 24 has a stop 37 which is disposed at one side of the conveyor 32 at a region which is nearer to the second than to the first of the endless members 79 and spaced therefrom, as best shown in FIG. 3. The switching unit 31 comprises an elongated frame pivotally mounted at one end at 72 at a region which is nearer to the first than to the second of the endless members 79. The opposite other end of each frame 31 overlaps the lower end of the conveyor 24 with which it coacts, the rollers 74 of the frame 31 being substantially parallel to and displaced with respect to the rollers on the conveyor and the first and second endless members 79.

As explained above, the frame 31 is angularly movable about the axis at 72 between a first lower position shown in FIG. 5 in which the rollers of the conveyor 24 function to support an article thereon and the stop 37 functions to arrest movement of the article, and a second higher position shown in FIG. 3 in which the rollers 74 of the frame 31 are at a higher level than the stop 37 and rollers of the conveyor 24 overlapped by the frame 31. Hence, in the second higher position of the frame 31 the frame rollers 74 function to raise the article from the lower end of the conveyor 24 and the stop 37. In the second higher position of the frame 31 the frame rollers 74 define an inclined path for moving articles downward thereon by gravity. The stop 80 arrests downward movement of articles on the frame 31 at a region above the first and second endless members 79 of the conveyor 32 and the latter functions to receive and move the article from the lower end of the frame responsive to downward movement thereof from its second raised position to its first lower position.

While I have shown and described a single embodiment of my invention, it will be apparent to those skilled in the art that modifications and changes may be made without departing from the spirit and scope of the invention. I therefore do not wish to be limited to the embodiment shown in the drawing and described in the specification and aim in the following claims to cover all modifications and changes which fall within the true spirit and scope of the invention.

I claim:

1. A conveyor system comprising a first movable conveyor including first and second spaced apart endless members for receiving and moving articles thereon, a second stationary conveyor which is transverse to said first conveyor and comprises spaced rollers defining a path for moving articles downward thereon by gravity, said second conveyor having a first stop to arrest downward movement of articles thereon, said first stop being disposed at one side of said first conveyor at a region which is nearer to said second endless member than to said first endless member and spaced therefrom, an elongated frame having spaced rollers, means for pivotally mounting one end of said frame for angular movement at a region which is nearer to said first endless member than to said second endless member, the opposite other end of said frame overlapping the lower end of said second conveyor with the rollers of said frame being substantially parallel to and displaced with respect to the rollers on said second conveyor and said first and second endless members, said frame being angularly movable about said pivotal mounting means between a first lower position in which the rollers of said second conveyor function to support an article thereon and said first stop functions to arrest movement of the article and a second higher position in which the rollers of said frame are at a higher level than the stop and rollers of said second conveyor which are overlapped by said frame and said frame rollers function to raise the article from the lower end of said second conveyor and said first stop, said frame rollers in the second higher position of said frame defining a path for moving articles downward thereon by gravity, and a second stop to arrest downward movement of articles by gravity on said frame at a region above said first and second endless members of said first conveyor, said first conveyor functioning to receive and move the article from the lower end of said frame responsive to downward movement thereof from its second raised position to its first lower position.

2. A conveyor system as set forth in claim 1 in which said frame includes vertically extending members for supporting the rollers thereon, said vertically extending members in that portion of said frame overlapping the lower end of said first conveyor being of increasingly greater vertical height in a direction from said stop at the lower end of said second conveyor toward the opposite other end of said frame.

3. A conveyor system as set forth in claim 1 in which the opposite other end of said frame overlaps the lower end of said second conveyor a longitudinal distance corresponding to at least half the length of the article and the opposite other end of said frame extends past a vertical plane through the center of gravity of the article when the article rests against said stop of said second conveyor.

4. A conveyor system as set forth in claim 1 which includes mechanism for moving said frame between its first lower position and its second higher position, control means for rendering said mechanism operable to move said frame from its first lower position to its second higher position, and means responsive to downward movement of an article on said frame against said second stop for rendering said mechanism operable to move said frame from its second higher position to its first lower position.

5. A conveyor system comprising a stationary conveyor comprising spaced rollers defining a path for moving articles downward thereon by gravity, said conveyor having a stop to arrest downward movement of articles thereon, an elongated frame having spaced rollers, means for pivotally mounting one end of said frame for angular movement about an axis which is spaced from the lower end of said conveyor and parallel to the rollers of said conveyor and said frame, the opposite other end of said frame overlapping the lower end of said conveyor with the rollers of said frame being parallel to and displaced with respect to the rollers of said conveyor along said path, said frame being angularly movable on said pivotal mounting means about said axis between a first lower position at the underside of said conveyor in which the rollers of said conveyor function to support an article thereon and said stop functions to arrest movement of the article and a second higher position in which the rollers of said frame are at a higher level than the stop and the rollers of said conveyor overlapped by said frame and the frame rollers function to raise the article from the lower end of said conveyor and said stop, said frame rollers in the second higher position of said frame defining a path for moving articles downward thereon by gravity, a movable conveyor having spaced apart endless members which are transverse to said stationary conveyor and bridged by said frame, and said frame including rollers which are parallel to and displaced from said endless members and below said endless members in the first lower position of said frame and above said members in the second higher position of said frame..

6. A conveyor system as set forth in claim 5 in which the opposite other end of said frame extends past a vertical plane through the center of gravity of the article when the article rests against said stop.

7. A conveyor system as set forth in claim 5 which includes another stop to arrest downward movement of articles by gravity on said frame.

8. A conveyor system as set forth in claim 5 in which the axes of the rollers of said frame are disposed substantially in a horizontal plane in the first lower position of said frame and are disposed in a plane inclined to the horizontal in the second higher position of said frame.

References Cited by the Examiner
UNITED STATES PATENTS

| | | | |
|---|---|---|---|
| 1,325,167 | 12/1919 | Olson | 198—156 |
| 2,065,674 | 12/1936 | Fay | 198—21 |
| 2,360,661 | 7/1943 | Eddy | 193—36 |
| 2,790,527 | 4/1957 | Griffith | 198—26 |
| 2,790,567 | 4/1957 | Rockwell | 198—26 |
| 2,985,323 | 5/1961 | Wilson | 198—21 |

HUGO O. SCHULZ, *Primary Examiner.*

SAMUEL F. COLEMAN, *Examiner.*